Jan. 13, 1959 L. P. HUNTER 2,869,112

COINCIDENCE FLUX MEMORY SYSTEM

Filed Nov. 10, 1955 2 Sheets-Sheet 1

*INVENTOR.*
LLOYD P. HUNTER
BY
William V. Sohelberg
AGENT

INVENTOR
LLOYD P. HUNTER
BY William J. Schelberg
AGENT

United States Patent Office 2,869,112

Patented Jan. 13, 1959

2,869,112

COINCIDENCE FLUX MEMORY SYSTEM

Lloyd P. Hunter, Poughkeepsie, N. Y., assignor to International Business Machines Corporation, New York, N. Y., a corporation of New York Application November 10, 1955, Serial No. 546,180

15 Claims. (Cl. 340—174)

This invention relates to magnetic memory devices and, more particularly, to improvements in such devices and in their use with magnetic core memory systems.

Memory components employing magnetic core storage elements are known in the prior art, with random access attained through the use of multiple coincidence of current pulses in employment of the principle that the response of a magnetic core having a substantially rectangular hysteresis loop is highly non-linear. Most systems of this type consist basically of a coordinate array of cores threaded by a grid of horizontal and vertical selection winding wires. Each core is maintained in one of its two remanent magnetic states, which arbitrarily are designated to represent binary "1" and "0," with information stored in a given core by delivery of a current pulse on a selected horizontal winding and a further current pulse on a selected vertical winding. The pulse polarity and windings are arranged so that the effects of both are additive only in a single core. The magnetomotive force provided by a single coordinate winding pulse is one half H, where H exceeds the threshold force of the magnetic core but is less than twice the threshold force. Only the single core that is acted upon by both the energized windings receives a force sufficiently great to change the established remanence state, provided the pulses are additive and in proper direction. The other cores linked by one or the other of the selected coordinate windings receive a one half H force and are not appreciably affected. Reading, or transmitting the stored binary information is performed in a similar manner but with the direction of the pulses applied to the selected horizontal and vertical windings in an opposite sense to that used for writing. An induced voltage is developed in a sense winding which links each of the cores in the coordinate plane, provided a change in state occurs in the interrogated core in that plane.

A major difficulty encountered in coincident current type of operation is that the current pulses applied to each selection winding must be accurately controlled and less than the threshold force by a predetermined amount depending upon the squareness of the hysteresis loop of the cores involved. When the drive pulses are actually terminated the half selected cores do not return to the same magnetic position as before and successive read and write direction pulses cause excursions of minor hysteresis loops in an effect known to the art as the "delta effect" and which causes partial signals and non-uniform signals to obscure the output. Further, the inability to increase the current magnitude on each coordinate selection line of such an array limits the speed with which the cores may be switched from one state to another because of these effects and the inherent threshold characteristic.

In accordance with the present invention a coincidence selection system is provided which is termed coincidence flux selection in distinction to the conventional coincidence current systems. The coincidence flux system is free of the limitations described and is capable of extremely fast operation. The basic memory element employed in the system of this invention comprises a magnetic core having its flux path divided in two parts with one coordinate selection winding embracing each of the separate parts. A current pulse applied to either one of these windings may saturate only that portion of the main flux path forming the divided parts regardless of its magnitude, so that the remanent state of the core as a whole may be changed only by concurrent energization of both selection windings in the same relative polarity. A coercive force threshold is not necessary in such a storage element or in other words, the hysteresis loops of the core material need not have sharply defined knees. The sense winding in the coincidence flux type array of cores is threaded through a further opening in each storage element so as to embrace only the outer section of the main flux path, at a point spaced from the aforementioned selection winding opening. As a result of this physical positioning, the sense winding experiences little or no flux change when one or the other selection winding is energized alone, as when an element is half selected, and an improvement in signal to noise ratio is achieved after a so-called disturbed state is attained.

An object of the present invention is to provide an improved magnetic core memory element requiring coincident inputs to cause a detectable change in magnetic state.

A further object is to provide an improved memory system employing magnetic cores storage elements operable in accordance with the principle of coincidence flux selection.

Another object of the invention is to provide a magnetic core memory element and system operable at high speeds.

Yet another object of the invention is to provide an improved pulse transfer controlling device.

Still another object of the invention is to provide a magnetic core logical element having an improved signal to noise ratio.

A further specific object of the invention is to provide an improved magnetic core logical element adapted to detect the coincident application of a plurality of input signals.

Other objects of the invention will be pointed out in the following description and claims and illustrated in the accompanying drawings, which disclose, by way of example, the principle of the invention and the best mode, which has been contemplated, of applying that principle.

Figures 4*a* to 4*d* comprise diagrams of the basic memory element wherein flux paths representing binary digits zero and one are illustrated in explanation of the theory of its operation and use.

Figure 5:
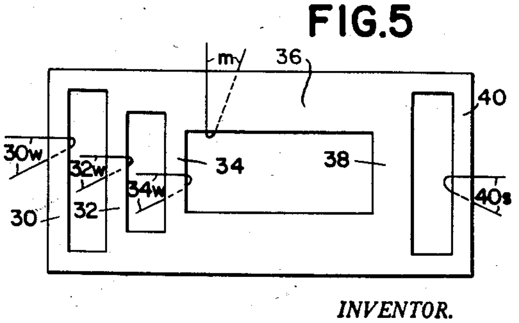

Figure 5 is a diagram of a multilegged magnetic structure adapted to detect coincident application of a plurality of input signals.

Figure 6:
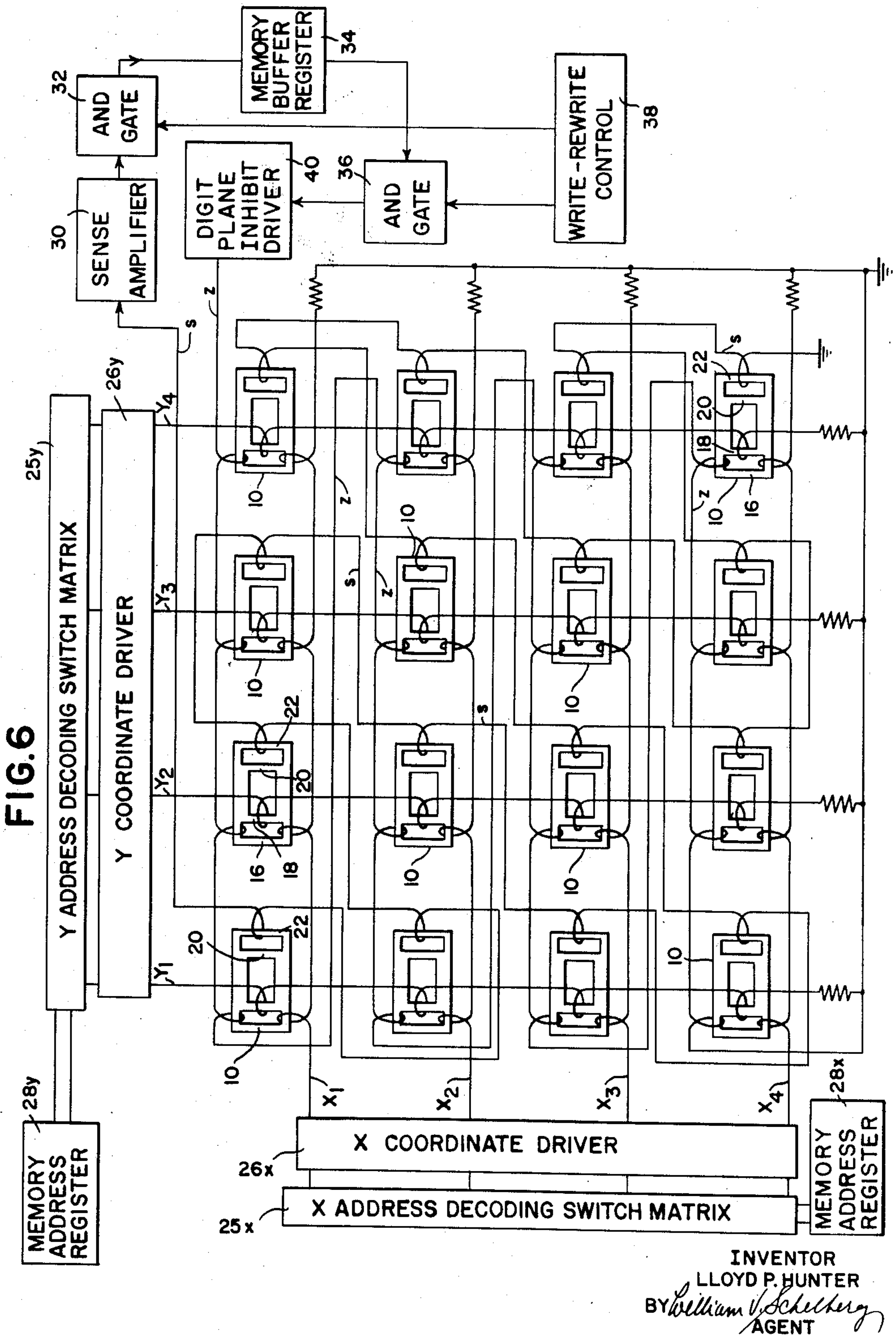

Figure 6 is a representation of one plane of a three dimensional array of magnetic elements operable in accordance with the improved coincidence flux technique.

Figure 1:
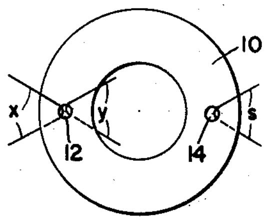
Figure 1 is a diagrammatic view of one form of the invention wherein a toroidal magnetic core is provided having subdivided cross-sectional areas with windings embracing the subdivided portions.

The basic structure of the magnetic storage element may comprise a pierced toroidal core 10 as shown in Figure 1 having an aperture 12 positioned within the principal flux path so as to divide the core into two parallel sections of substantially equal cross-sectional area immediately adjacent one another. The opening 12 may be drilled or otherwise formed and may be positioned parallel to the axis of the core as shown or in a radial direction or at any selected angle intermediate these extremes provided the flux paths are substantially equal and are separate. Obviously the form of the core need not be toroidal and rectangular and other configurations of both core and openings are contemplated so as to be considered within the scope of the present description and claims. A modified arrangement is shown for example in Figure 2 wherein the openings and windings to be described are given designations similar to those used in Figure 1.

Referring again to Figure 1, the toroidal core 10 is provided with a first winding *x* linking the outer core section through the opening 12 and a second winding *y* linking the inner core section through this opening. The *x* and *y* windings are illustrated as having only a single turn but may comprise plural turns if so desired and may be poled in any manner, however, for the purposes of the present explanation the polarity is to be considered additive when pulses of like polarity are applied with positive pulses acting to provide a positive direction magnetomotive force. The negative remanence direction is selected as a datum condition or as representative of binary "0" and the positive remanence direction then is representative of binary "1." It is of course obvious that the positive or negative direction of remanence might be selected for a reference condition and either positive or negative pulses may be employed to drive the core to either state depending on the polarity of the windings themselves.

Again referring to Figure 1, the core 10 is provided with a further opening 14 that is positioned through the core so as to allow a winding *s* to be threaded therethrough and to embrace a portion of the main flux path remote from the portions linked by the *x* and/or *y* windings.

The invention is based upon the phenomenon that a complex flux path is established in the core 10 when either one of the windings *x* or *y* is pulsed in a sense reverse to the established datum direction. Establishment of this complex flux path results in little flux change in the outer radial volume of the core but in a complete reversal of the flux in the inner radial volume. This occurrence is believed due to the fact that the outer volume, which comprises the greater amount of magnetic material, drives the inner volume sufficiently to cause such a reversal as will be explained more fully hereafter. The purpose in positioning of the winding *s* so as to link only the outer volume is to allow the flux change caused by a single input to be ineffective in developing an output signal.

Figure 3:
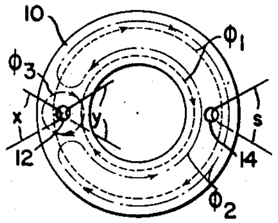
Figure 3 is a diagram of the memory element illustrating certain flux paths established therein.

Experimental data leads to the conclusion that the flux path established as a result of pulsing one or the other of the *x* or *y* windings is kidney or crescent shaped as shown in Figure 3 where $\phi_1$, shown as dotted lines, represents the datum remanence flux or binary "0" and $\phi_2$, shown as dot-dash lines, represents the flux condition in the main body of the core when either the winding *x* or *y* has been pulsed in a reverse sense or positively and $\phi_3$, shown as a dash line, represents the flux path developed around the hole 12. The direction of the flux $\phi_3$ depends only upon whether the *x* or *y* winding has been pulsed and, as shown in the figure, has resulted from pulsing the *y* winding positively. It is thus seen that the flux linked by the output winding *s* remains unchanged from that in datum state when either winding *x* or *y* alone is pulsed.

Figure 2:
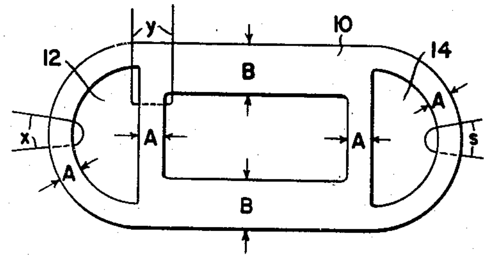
Figure 2 is a representation of a further modification in the form of the basic memory element.

The geometry of the magnetic structure is shown more clearly in Figure 2 where it is seen that the form may be other than toroidal with the core sections designated B comprising twice the cross-sectional area of those designated A. Currents flowing through the windings *x* and *y* in a selected direction are capable of saturating the sections A that they link directly and, if they are in the same direction, as for example when both *x* and *y* pulses are coincident and negative, this flux will be sufficient to saturate the sections B as well as the sections A at the other end of the structure in a "0" direction. If currents of opposite direction, positive for the purposes of explanation as previously set forth, are applied to both windings, the entire structure is saturated in the opposite or "1" direction. A current applied only to the *x* winding saturates the core volume A that it links but the flux $\phi_3$ returns on the other side of the drive hole 12 and does not saturate the remainder of the structure provided the central opening in the structure is large compared with that of the hole 12. Similarly, if a current is applied to the *y* winding only, it affects the material around the drive hole 12 but does not saturate the remainder of the structure as only the direction of the flux around the hole 12 is changed. The induced flux provided by windings *x* and *y* must be coincident to change the flux direction in the volume A that is linked by the sense or output winding, *s*, and there is no dependence upon a square corner of a hysteresis loop or a specific selection ratio coercive force as in a coincidence current system.

When a positive current is present in the *x* or *y* winding alone, assuming the datum flux condition $\phi_1$ has previously been established, the material around the drive hole 12 saturates in a reverse sense and the path of the main flux is broken. When this occurs the main flux closes its path by reversing the direction of magnetization of the interior of the structure at the expense of the exterior since the interior path length is considerably less than that of the exterior. This action and the resulting flux paths developed are seen more clearly in Figures 4*a* to 4*d* where a somewhat modified structure is illustrated. To facilitate the description, the several legs of the structure are labeled with the *x* drive leg designated 16, the *y* drive leg 18, and, at the right hand or output end, the inner path leg is designated 20 and the outer path or sense leg 22.

Figure 4A:
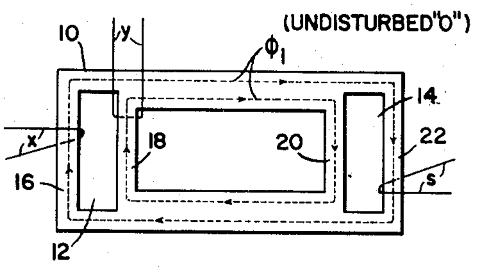
Figure 4B:
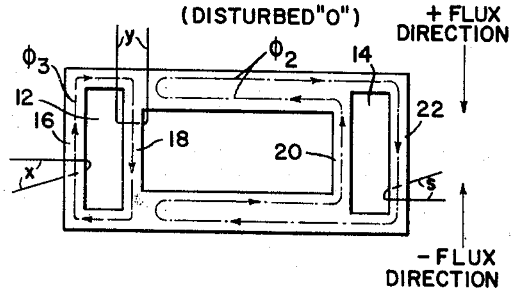
Figure 4C:
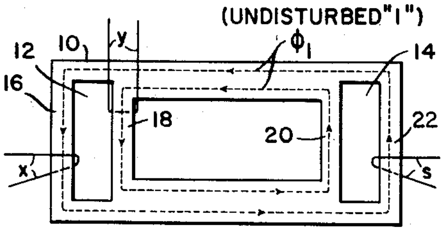
Figure 4D:
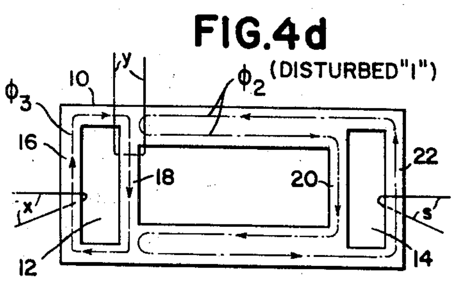

Figure 4*a* represents an undisturbed zero flux condition; Figure 4*b* represents a disturbed zero flux condition after pulsing the winding *y* alone in a write one or positive sense, pulsing of the winding *x* alone reverses the direction of $\phi_3$ from clockwise to counterclockwise but $\phi_2$ remains the same; Figure 4*c* represents an undisturbed one flux condition after both windings *x* and *y* are coincidentally pulsed in a write one or positive sense; and Figure 4*d* represents a disturbed one condition resulting from pulsing winding *x* alone in a read or write zero direction, pulsing of *y* alone in this sense again reversing the direction of $\phi_3$ from clockwise as shown to counterclockwise but $\phi_2$ remains the same.

An exhaustion listing of all combinations of initial flux patterns and *x* and *y* input current pulses is given in the following table where the + and — signs in the flux columns indicate the direction of the flux in the inner and outer parts of the core structure as in legs 20 and 22. For example, a + for both inner and outer paths means that the core structure is saturated in a clockwise direction around the center opening, as for the undisturbed zero datum state of Figure 4*a*. A + for the outer path 22 and a — for the inner path 20 means that the flux pattern for the right half of the structure shown in Figure 4*b* obtains for a disturbed zero condition. None of the flux directions for the drive hole end of the structure are given in the table, however, + signs in the *x* and *y* columns refer to the current directions which induce an upward flux in the drive legs 16 and 18 respectively of the structure. A + sign in the *s* column means that direction of current which is induced by the flux in the sense leg 22 of the structure is changed from the downward to the upward direction.

In terms of a memory system rows 1 through 8 in the table represent an undisturbed "one" in the initial flux pattern. Rows 9 through 16 represent a disturbed "zero." Rows 17 through 24 represent a disturbed "one." And rows 25 through 32 represent an undisturbed "zero." Rows 2, 4, 6 and 8 represent the disturbing of a "one." Rows 26, 27, 28 and 31 represent the disturbing of a "zero." Rows 1, 9, 17 and 25 represent writing a "one."

Row 5 represents reading an undisturbed "one," and row 21 represents reading a disturbed "one." Rows 5, 13, 21 and 29 represent writing a "zero." Row 29 represents reading an undisturbed "zero," and row 13 represents reading a disturbed "zero."

The disturbing operations indicated by rows 2, 4, 10, 12, 18, 20, 26 and 28 would not occur if only $x$ and $y$ drive windings were used in a simple memory system. Their equivalents do occur however if extra windings such as inhibit windings are used on the drive legs of the structure as will be explained more fully hereafter.

*Table*

| Row No. | Initial Flux | | $x$ | $y$ | Final Flux | | $s$ |
|---|---|---|---|---|---|---|---|
| | Inner Path (20) | Outer Path (22) | | | Inner Path (20) | Outer Path (22) | |
| 1 | + | + | + | + | + | + | 0 |
| 2 | + | + | + | − | − | + | 0 |
| 3 | + | + | + | 0 | + | + | 0 |
| 4 | + | + | − | + | − | + | 0 |
| 5 | + | + | − | − | − | − | + |
| 6 | + | + | − | 0 | − | + | 0 |
| 7 | + | + | 0 | + | + | + | 0 |
| 8 | + | + | 0 | − | − | + | 0 |
| 9 | + | − | + | + | + | + | − |
| 10 | + | − | + | − | + | − | 0 |
| 11 | + | − | + | 0 | + | − | 0 |
| 12 | + | − | − | + | + | − | 0 |
| 13 | + | − | − | − | − | − | 0 |
| 14 | + | − | − | 0 | + | − | 0 |
| 15 | + | − | 0 | + | + | − | 0 |
| 16 | + | − | 0 | − | + | − | 0 |
| 17 | − | + | + | + | + | + | 0 |
| 18 | − | + | + | − | − | + | 0 |
| 19 | − | + | + | 0 | − | + | 0 |
| 20 | − | + | − | + | − | + | 0 |
| 21 | − | + | − | − | − | − | + |
| 22 | − | + | − | 0 | − | + | 0 |
| 23 | − | + | 0 | + | − | + | 0 |
| 24 | − | + | 0 | − | − | + | 0 |
| 25 | − | − | + | + | + | + | − |
| 26 | − | − | + | − | + | − | 0 |
| 27 | − | − | + | 0 | + | − | 0 |
| 28 | − | − | − | + | + | − | 0 |
| 29 | − | − | − | − | − | − | 0 |
| 30 | − | − | − | 0 | − | − | 0 |
| 31 | − | − | 0 | + | + | − | 0 |
| 32 | − | − | 0 | − | − | − | 0 |

From the foregoing it should be apparent that a structure driven by this coincident flux method can be operated with as high currents in the $x$ and $y$ windings as may be desired. Since the entire structure can only be switched by a coincidence of the fluxes in the two drive legs 16 and 18 induced in the same direction, it follows that when either $x$ or $y$ driving current is present alone it can be as large as desired without any chance of effecting the sense leg 22 of the structure since it can do no more than saturate the driving leg. This means that the speed of a memory made from such devices can be greatly increased over the speed of a memory using coincident current operated cores made of the same material, because switching time is directly related to the magnitude of the applied magnetomotive force.

The primary advantages of the coincidence flux element resides in insensitivity to drive current amplitude, waveform or rise time, which allows extremely high speed operation if high power current pulse drivers are used, and the lack of dependence upon square loop material provided the remanence to saturation flux density ratio is good. This latter feature opens up new fields of magnetic materials for memory usage.

With the structure shown in Figures 1 and 3 it is particularly advantageous to position the hole 14 nearer the outer periphery of the toroidal core since, with the outer radial volume providing the energy to switch the inner radial volume in forming the kidney shaped flux path, the core material nearer the outside most portion experiences a lesser flux change and less noise signal occurs when the disturbed flux state is developed and when a change takes place from a disturbed to an undisturbed condition as when a disturbed zero is read out. The structure shown in Figures 2 and 4 is less susceptible to such noise as the inner and outer paths are separated over a greater path length than is the toroidal core form.

Since switching of the core 10 can occur only upon proper coincident pulsing of the $x$ and $y$ windings, it follows that the arrangement disclosed meets the requirements for a logical "and" device of a type similar to that disclosed in the copending U. S. application, entitled "Magnetic Core Logical Devices," Serial Number 530,524, filed August 25, 1955, on behalf of Edgar A. Brown and which application is assigned to the same assignee as the present application. The memory element of the present invention distinguishes over that disclosed and claimed in the foregoing application in the positioning of the sense winding so as to link only a portion of the principal flux path and it should be noted here that the hole 14 may be positioned so that the sense winding embraces more or less than half the principal flux path with the signal output and noise level varied accordingly as described above.

The basic structure may also be arranged to provide a multiple "and" circuit logical switching device for use with more than two inputs by providing a separate input leg for each such input signal and proportioning the volume of magnetic material in remainder of the core body. A three input coincidence circuit is shown for example in Figure 5 where three input legs designated 30, 32 and 34 are provided, each comprising an equal volume of magnetic material with the main flux path 36 made equal to the total of this combined volume and with the output end of the structure comprising legs 38 and 40 where the leg 38 has a volume equal to that of two of the input legs and the leg 40 has a volume equal to that of one of the input legs. A winding $w$ is provided for each of the input legs and a winding $s$ is provided for the output leg 40. A set winding $m$ may also be provided on the main body portion 36 so that a pulse applied to the set winding establishes a datum flux direction throughout the structure. A pulse of opposite sense applied to any one of the input windings $w$ then causes the kidney shaped flux path to be established, as in the structure previously described, with no resultant change in flux direction through the sense leg 40. However, when all the input windings 30$w$, 32$w$ and 34$w$ are pulsed in an opposite sense simultaneously, the flux in leg 40 is reversed and an output pulse is developed in the winding 40$s$ to indicate this fact.

A coincidence of any number of input signals may be detected in a similar structure wherein an input leg is provided for each signal possibility as for example $n$, with each such leg having a like cross sectional area and the body of the structure having a cross sectional area equal to the total of that in all of the $n$ input legs and the output leg having a cross sectional area like that of one of the input legs.

The improved memory element shown in Figures 1–4 has particular use as a matrix memory component and may be incorporated into a two dimensional array as illustrated in Figure 6. Such an arrangement as used with and forming part of a cubical or three dimensional array requires the provision of a fourth winding $z$ termed an inhibit winding in addition to those previously mentioned in connection with the element per se. While a single four by four plane comprising a total of sixteen cores is shown for sake of simplification, it is obvious that the number in any coordinate dimension is not limited except by the winding impedance presented by a plurality of cores driven by any one driver source.

In a three dimensional system a plurality of like two dimensional arrays or $z$ planes are arranged so that the $x$ and $y$ windings link cores in each $z$ plane in series so that selection of a particular $x$ and a particular $y$ winding address fully energizes a like positioned core in each of the $z$ planes. The $x$, $y$ address then selects a multi bit binary word composed of these several like positioned cores for reading and writing. The sense winding *s* is individual to each such plane so that when a word is read out of the array each bit signal is delivered to the individual sense winding for that plane and may be a "0" or a "1" signal as indicated by its amplitude. To write a word in such an array, the *x* and *y* address windings are pulsed in a positive or write "1" sense and each core in the word line tends to store a "1" unless the inhibit winding *z* for a plane is energized. In this manner the zero bits of a binary word are entered, by counteracting the magnetomotive force effect of either the *x* or the *y* winding in that plane. As shown in Figure 6, the inhibit winding *z* links the *x* drive leg and counteracts the magnetomotive force of this winding, however, it is obvious that it may be provided around the *y* drive leg with identical results obtained.

Coincidence of two input signals is required to cause a shift in the flux direction in the section 22 of an individual storage element linked by the sense winding *s* and for this purpose and *x* and *y* coordinate windings are energized selectively through a decoding matrix 25 and pulse driver 26. The decoding matrices or address selecting systems 25 may be in the form of a crystal diode matrix, for example, with separate *x* and *y* windings on each storage element 10 for the read and write operations as shown in the copending application, Serial Number 376,300, filed August 25, 1953, for a coincident current selection system. Other suitable circuits illustrating address selecting matrices are disclosed in an article entitled "Rectifier Networks for Multiposition Switching" as published in the Proceedings of the I. R. E. of February, 1949, pages 139–147. Use of a diode matrix or similar device reduces the number of input switches required as by controlling *n* inputs thereto, any one of the $2^n$ output lines may be selectively energized. It has been impractical for a conventional diode matrix to drive a large memory array directly, due to the recovery time and the power required, however, and separate driver elements are usually employed. These drivers may comprise magnetic cores as shown in application, Serial Number 440,983, filed July 2, 1954, on behalf of R. G. Counihan, or transistors as shown in application, Serial Number 511,082, entitled "Transistor Amplifiers" filed May 25, 1955, on behalf of J. B. Mackay et al. Selection signals are applied to the drivers 26 from the switch matrices 25 which are in turn activated from a memory address register 28.

Selection of a particular word and the bit of that word stored in one plane is accomplished by energizing the *x* and *y* winding that is common to that single bit core. Such energization must be coincident at least during a part of the time of application but the pulses may be staggered as set forth in application, Serial Number 442,013, filed July 8, 1954, on behalf of M. K. Haynes.

The cores may store a binary "1" or binary "0" as represented by the aforementioned flux patterns for a disturbed and undisturbed condition as described previously and, if the sense of the flux generated by both input windings is such as to reverse that flux in leg 22 linked by the sense winding *s* an output signal is developed and is directed to a sense amplifier 30 to be gated through a gate 32 to a memory buffer register 34 during read time. If it is desired that this information be restored to the memory array bit core 10, an and gate 36 is activated during the subsequent write cycle interval as controlled by a write-rewrite control 38 so that an inhibit driver 40 is selectively controlled to counteract the effects of the *x* or *y* coordinate write pulse by energization of the *z* winding for that bit plane.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic core memory device comprising a magnetic circuit capable of assuming stable remanence conditions and having a first and second portion thereof divided into parallel flux paths, a first input winding for one flux path of said first portion, a second input winding for the other flux path of said first portion, and an output winding for that part of said second portion having the greater flux path length.

2. A magnetic core memory element comprising a magnetic circuit capable of assuming stable remanence conditions and having a first portion divided into at least two parallel flux paths, means individual to in each of the parallel flux paths of said first portion for producing therein, and means responsive to variations of flux in a part only of a second portion of said magnetic circuit.

3. A pulse transfer controlling device comprising a core of magnetic material capable of assuming one or the other of two residual magnetic states, a first winding means for establishing a magnetic flux in one path of a first portion of said magnetic core, a second winding means for establishing a magnetic flux in another path of said first portion of said magnetic core adjacent said one path, and third winding means embracing a second portion of said magnetic core remote from said first portion, said third winding embracing less than the complete flux path provided by said second portion.

4. A magnetic core memory device comprising a closed loop of magnetic material capable of attaining one or the other remanence state of flux density, a first opening positioned through said loop substantially at the center line, a first input winding positioned through said opening and linking a part of said loop, a second input winding positioned through said opening and linking another part of said loop, a further opening positioned through said loop remote from said first opening, and output winding means positioned through said further opening so as to link only the outer radial periphery of said loop.

5. A magnetic core logical device comprising a magnetic circuit capable of assuming stable remanence conditions and having a portion thereof divided into at least a first and second auxiliary flux path and a further portion divided into at least a third and fourth auxiliary flux path, a first and second winding means embracing said first and second auxiliary flux paths respectively, and output winding means embracing only said fourth flux path.

6. A magnetic core logical device comprising a magnetic circuit capable of assuming stable remanence conditions and having a portion thereof divided into two auxiliary flux paths, means for producing flux in each of said paths in accordance with an input condition and means associated with less than the entire magnetic circuit of a further portion thereof which is responsive to variations of flux in said magnetic circuit, said variations of flux being indicative of the time relationship of said input conditions.

7. A multiple coincidence logical device comprising a magnetic circuit capable of assuming stable remanence conditions and having a plurality of input legs each having a like cross-sectional area of magnetic material, a main flux path having a cross-sectional area equal to the combined area of said input legs, a bypass leg having a cross-sectional area less than that of said main flux path, and an output leg having a cross-sectional area less than that of said bypass leg, input winding means individually embracing each of said input legs, and output winding means linking said output leg.

8. A magnetic core coincidence circuit comprising a multilegged magnetic structure capable of attaining opposite stable remanence states of flux density, a plurality of input legs, winding means positioned about said input legs and individual thereto, an output leg, output winding means positioned about said output leg, said core having a bypass leg comprising a flux path wherein the flux direction may be changed by energization of at least one of said input windings, means for selectively energizing said input windings wherein coincidence in energization in one sense establishes a datum flux pattern representative of a datum state of remanence and energization of less than all said input windings in an opposite sense establishes a flux pattern wherein the flux direction in the output leg remains unchanged from that provided by said datum flux pattern.

9. A magnetic core memory device comprising a closed loop of magnetic material capable of assuming stable remanence conditions, a first opening positioned through said loop substantially at the center line and dividing the loop into two substantially equal flux paths, a first winding positioned through said opening and linking one of said flux paths, a second winding positioned through said opening and linking the other of said flux paths, and an output winding linking a portion of said loop of magnetic material through a second opening remote from said first opening.

10. In a magnetic memory array a storage element comprising a core of magnetic material capable of assuming stable remanence conditions and defining a closed flux path having first and second openings therethrough each dividing said flux path into parallel sections, input winding means positioned through said first opening and individual to each of said parallel sections formed thereby, output winding means positioned through said second opening so as to embrace that section formed thereby having the longer flux path, and means for energizing said input winding means in coincidence to develop a flux in the same direction in the parallel sections adjacent said first opening to store binary information and in opposite directions to transmit said stored information by causing a flux change in the core section embraced by said output winding.

11. A magnetic core memory array having a plurality of storage elements each capable of assuming stable remanence conditions and arranged in coordinate columns and rows, wherein said elements comprise a magnetic circuit defining a closed flux path having first and second input legs and third and fourth output legs, first input winding means individual to each said row and linking the first leg of the elements thereof, second input winding means individual to each said column and linking the second leg of the elements thereof in an additive sense, output winding means linking the fourth leg of each said elements so that the sense of said output winding means on half said elements is opposed to the sense on the remaining half, and inhibit winding means linking one of said input legs on each of said elements.

12. A multilegged magnetic storage element capable of attaining a plurality of stable flux patterns representative of binary information, input winding means positioned about a first and second leg of said core and individual thereto, output winding means positioned about a third leg of said core, said core having a fourth leg comprising a flux path wherein the flux direction may be changed by energization of at least one of said input windings, means for selectively energizing said input windings wherein coincidence in energization in one sense establishes a datum flux pattern representative of one binary digit with said flux pattern being changed by energization of one of said input windings alone to establish further flux pattern representative of the same binary digit and coincidence in energization of said input windings in another sense establishes a flux pattern representative of the other binary digit, said flux patterns representing the same binary digit having a flux direction in said third leg in like sense.

13. A pulse transfer controlling device comprising a closed magnetic structure fabricated of a material capable of attaining one or the other stable remanence state of flux density, a plurality of input winding means inductively associated with said structure and operable only upon coincident energization thereof to establish a uniform remanence flux direction throughout said structure, and output winding means inductively associated with said structure and adapted to detect only the establishment of one uniform flux direction remanence state in said structure.

14. A pulse transfer controlling device comprising a toroidal magnetic core defining a closed flux path of magnetic material capable of attaining one or the other stable residual state, a first opening positioned through said flux path so as to provide parallel sections of substantially equal cross-sectional area, winding means individual to each said sections, a second opening positioned through said flux path and located apart from said first opening, said second opening dividing said flux path into further parallel sections of unequal cross-sectional area, and further winding means individual the further section of lesser cross-sectional area.

15. In a circuit for storing logical results of information applied thereto, a pair of input windings, means for energizing said input windings to apply input information to said logical circuit, a magnetic element inductively associated with said input windings and normally in a first stable state of flux remanence but responsive to exclusive energization of either of said windings to assume a second distinguishable different stable state of flux remanence and to coincident energization of said windings to assume a third distinguishably different stable state of flux remanence.

References Cited in the file of this patent

UNITED STATES PATENTS

| | | |
|---|---|---|
| 2,519,426 | Grant | Aug. 22, 1950 |
| 2,614,167 | Kamm | Oct. 14, 1952 |
| 2,640,164 | Giel et al. | May 26, 1953 |

FOREIGN PATENTS

| | | |
|---|---|---|
| 881,089 | Germany | June 25, 1953 |

OTHER REFERENCES

The Transfluxor—a Magnetic Gate With Stored Variable Setting (Rajchman), RCA Review, June 1955, vol. 16, pp. 302 to 308.

UNITED STATES PATENT OFFICE

CERTIFICATE OF CORRECTION

Patent No. 2,869,112 January 13, 1959

Lloyd P. Hunter

It is hereby certified that error appears in the printed specification of the above numbered patent requiring correction and that the said Letters Patent should read as corrected below.

Column 8, line 16, after "individual to" strike out "in"; line 17, after "producing" insert -- flux --; column 10, line 43, for "distinguishable" read -- distinguishably --.

Signed and sealed this 10th day of November 1959.

(SEAL)
Attest:

KARL H. AXLINE

Attesting Officer

ROBERT C. WATSON
Commissioner of Patents